United States Patent [19]

Gupta

[11] Patent Number: 5,303,267
[45] Date of Patent: Apr. 12, 1994

[54] MULTIPOINT DATA COMMUNICATIONS SYSTEM

[75] Inventor: Sudhir Gupta, Carrollton, Tex.

[73] Assignee: DSC Communications Corporation, Plano, Tex.

[21] Appl. No.: 878,043

[22] Filed: May 4, 1992

[51] Int. Cl.⁵ .................... H04K 1/10; H04L 27/28; H04J 3/04; H04Q 11/00
[52] U.S. Cl. ........................ 375/38; 370/112; 370/56; 340/825.03; 340/825.05
[58] Field of Search ............ 375/38, 107; 370/93, 370/112, 113, 56, 68; 340/825.03, 825.05

[56] References Cited

U.S. PATENT DOCUMENTS 3,914,743 10/1975 Fitch et al. .................. 340/825.05
3,921,138 11/1975 Burns et al. .................. 340/825.03

Primary Examiner—Stephen Chin
Assistant Examiner—Duane Kobayashi
Attorney, Agent, or Firm—Baker & Botts

[57] ABSTRACT

Standard multipoint junction units (MJUs) are used in parallel-connected MJU sets for a private multipoint data communications network. The MJU sets provide communications between remote terminals and a central site at rates faster than those provided by a stand-alone MJU. On the remote terminal side of the MJU set, data from a remote terminal on two or more adjacent channels are carried on a multichannel transmission line, such as a T1 line, to a transmission line port unit. Adjacent output channels from the port unit are connected to branch ports of each MJU of the MJU set, such that the branch port of each MJU that is associated with that terminal receives one channel. On the central site side of the MJU set, adjacent channels are connected from a transmission line port unit to the master input of each MJU. Connections between the MJU ports and the port units are through a time slot interchange matrix, which ensures that the data is maintained in its proper sequence.

18 Claims, 5 Drawing Sheets

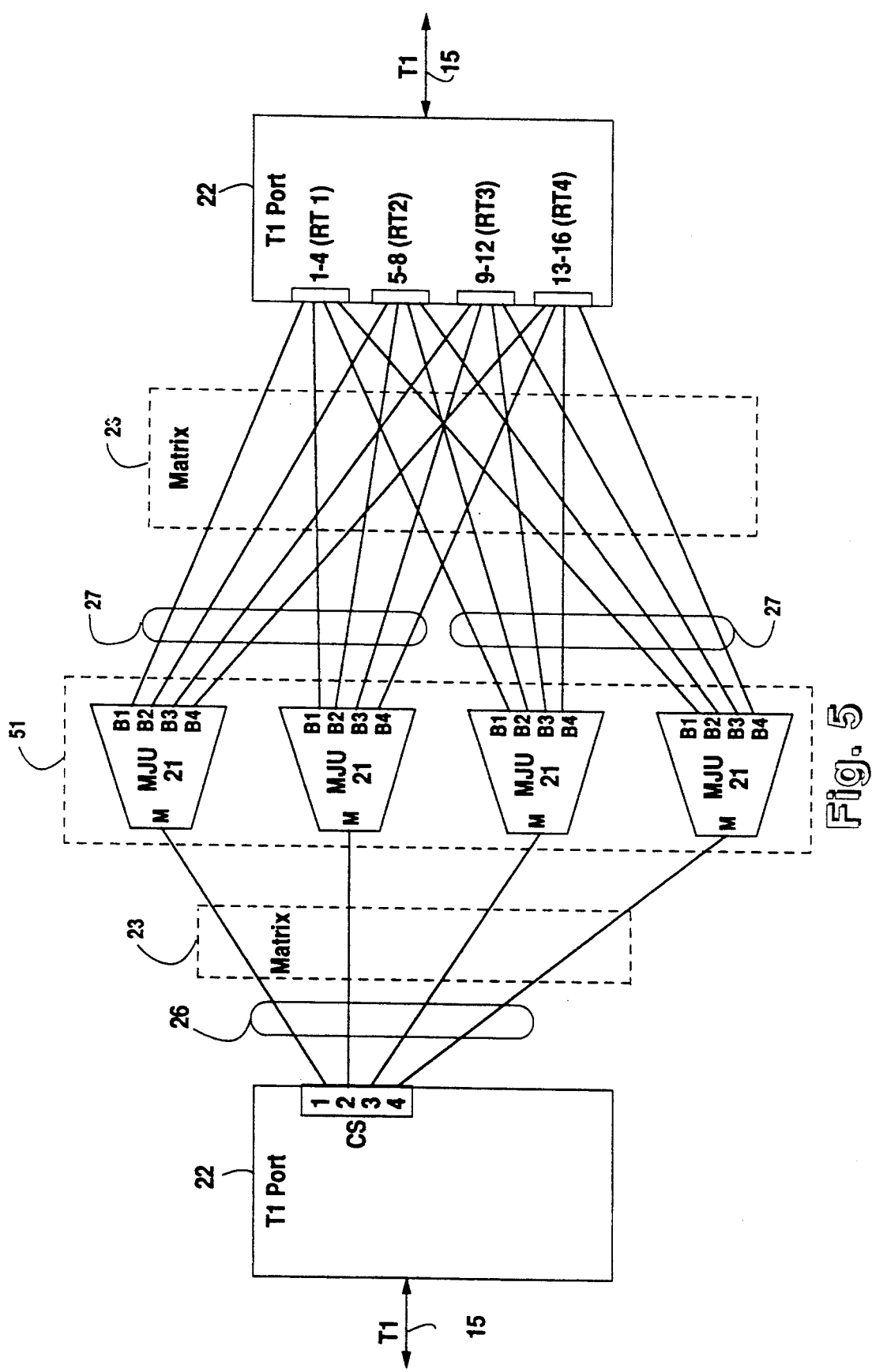

MULTIPOINT DATA COMMUNICATIONS SYSTEM

TECHNICAL FIELD OF THE INVENTION

This invention relates to digital communications, and more particularly to an apparatus and method that use standard multipoint junction units to provide wideband data bridging between a number of terminals and a central data processing station.

BACKGROUND OF THE INVENTION

In the early 1970s, communications carriers began offering communications networks designed for transmission of digital data. In 1974, the Federal Communications Commission approved the Bell System's Dataphone digital service (DDS). DDS is a synchronous facility providing full-duplex service. Primary channel speeds are 2.4, 4.8, 9.6, and 56 kilobits per second.

Terminal access to the DDS network is accomplished by means of a digital service unit, which alters serial unipolar signals into forms of modified bipolar signals for transmission and returns them to serial unipolar signals at the receiving end.

These DDS links may be either point-to-point or multipoint. Point-to-point links establish a direct connection between two points in a network. Multipoint links are analogous to "party lines" used for telephone voice communications. They permit one line to link all terminals to a central location, such as a main computer. The advantage of multipoint service is that the sharing of a line reduces the cost. However, problems arise if two terminals attempt to send data at the same time.

For a multipoint line structure to be effective, one station must be the master, or central processing, station, while the other stations are slaves. A special control unit is used as an interface between the master location and the slave locations. This control unit, known as a multipoint junction unit (MJU), permits the interconnection of a number of terminals (slaves) to a central site (master) via data communications lines. The function performed by the MJU is commonly referred to as "data bridging".

In operation, line discipline imposed by the user of the multipoint network seeks to prevent more than one terminal from transmitting data at any time, although two or more terminals may receive data simultaneously. This line discipline combines polling and selecting techniques and requires that each terminal on the line have a unique address, as well as circuitry to respond to a message sent to that address. Standards for MJUs are published in a document entitled *Digital Data System (DDS) Multipoint Junction Unit Requirements*, Technical Advisory No. TA-TSY-000192, published by Bell Communications Research, Inc.

A limitation of existing MJU devices is that they are restricted to transmissions at the standard DDS data rates, which provide a maximum data rate of 56 kilobits per second. However, these data rates are slow compared to the faster rates now used in switched telephone systems, such as the 1.544 megabits per second rate of T1 carriers or fractional T1 carriers. There is a growing need to provide digital data bridging at rates greater than 56 kilobits per second. Examples of applications that need this functionality are digital video teleconferencing and data transfers between central and branch offices of institutions such as banks that handle voluminous data.

As an alternative to the standard MJU, many data communications manufacturers have developed proprietary multipoint bridging units. These have the advantage of providing for higher data rates, but require special equipment for ensuring synchronization of the data on each line at the receiving end. Also, being proprietary, these units have no standard method for testing. A need exists for a method of using existing MJUs to provide bridging at higher data rates.

SUMMARY OF THE INVENTION

The method aspects of the invention involve the connections of a multipoint network at a central office of a DDS service provider, as well as the real time operation of transmitting data between remote terminals and the central site of the customer.

Thus, a first aspect of the invention is a method of interconnecting at least two standard multiple junction units (MJUs) for providing wideband data communications on data channels of a transmission line. A exemplary method for two parallel connected MJUs is described. On the remote terminal side of the central office, a branch port of a first MJU is connected to a first channel-port of a remote terminal port unit. A corresponding branch port of a second MJU is connected to a second channel-port of the remote terminal port unit. The first channel-port and the second channel-port of the remote terminal port unit are for adjacent channels. On the central site side of the central office, a master port of the first MJU is connected to a first channel-port of a central site port unit. A master port of the second MJU to a second channel-port of the central site port unit. The first channel-port and the second channel-port of the central site port unit are for adjacent channels. All connections are by means of a time slot interchange switching system, such that during operation, data transmitted on adjacent channels will arrive on adjacent channels.

The real time method aspects of the invention involve the use of a set of parallel-connected MJUs and a sequential time slot interchange matrix. The data rate corresponds to the number of MJUs in the set, being a multiple of the 56 kb/s rate permissible with a stand alone MJU. The apparatus aspects of the invention involve the central office connections of the MJUs and the related transmission line ports via a sequential time slot interchange matrix.

A technical advantage of the invention is that a service provider, such as a telephone company, can use existing MJU hardware to provide wideband bridging service for its customers. The data is provided on adjacent channels of existing transmission lines via an electronic switching matrix. No special equipment is required to maintain interchannel synchronization and sequence.

BRIEF DESCRIPTION OF THE DRAWINGS

FIG. 5 is a block diagram of an MJU set having four MJUs and T1 port units for incoming and outgoing T1 lines.

DETAILED DESCRIPTION OF THE INVENTION

Figure 1:
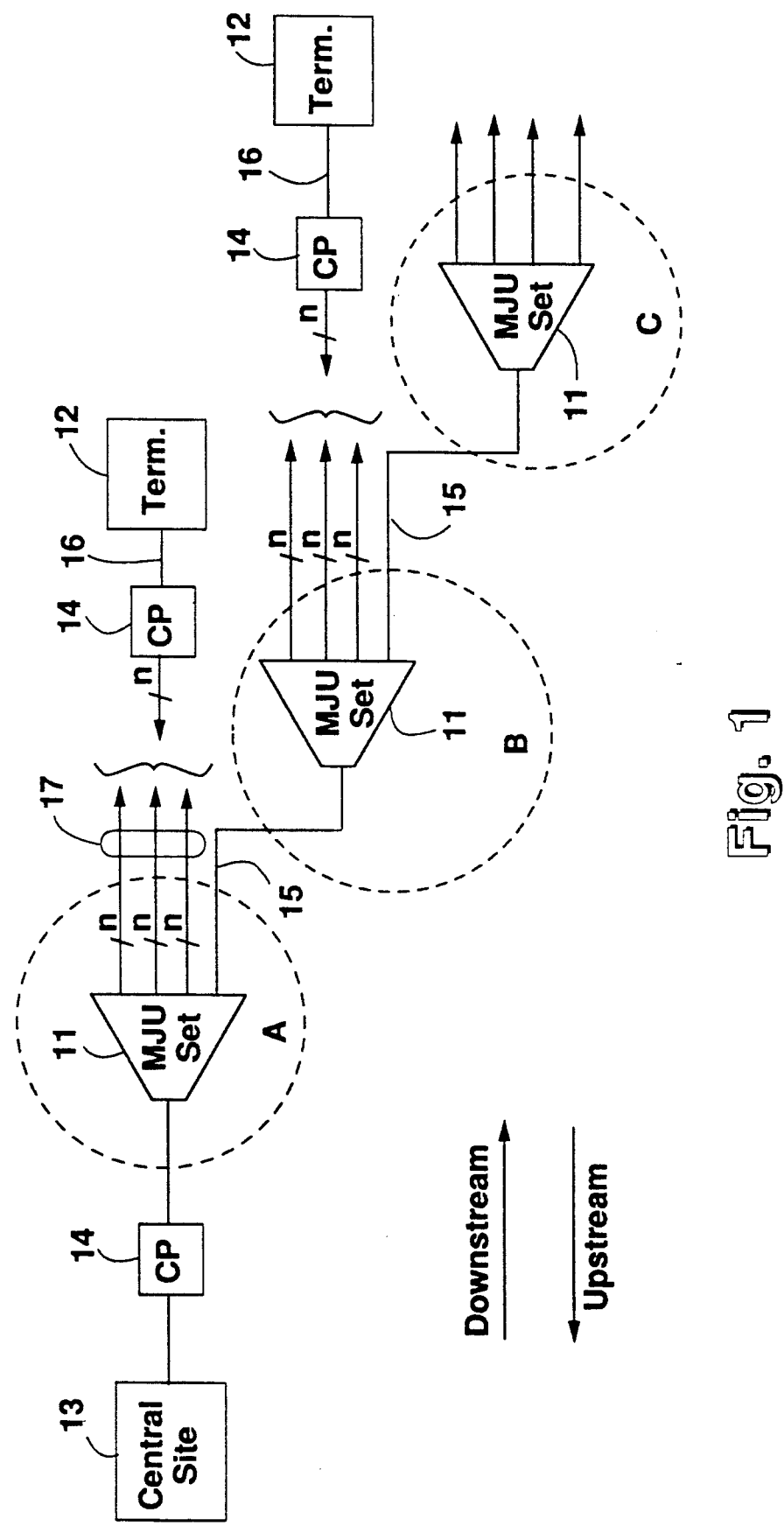
FIG. 1 illustrates a DDS multipoint network that uses the MJU sets of the invention.

FIG. 1 illustrates a DDS (digital data service) multipoint circuit that uses wideband MJU (multiple junction unit) sets 11 in accordance with the invention. A number of wideband MJU sets 11 are cascaded to link remote terminals 12 in a number of geographically distant areas to a central site 13.

The wideband MJU sets 11 permit MJUs originally designed for 56 kb/s (kilobit per second) DDS operation to be interconnected and used for multipoint applications that require greater bandwidth. As explained in further detail in connection with FIG. 2, each MJU set 11 is comprised of two or more standard MJUs, which standing alone would be limited to 56 kb/s operation. The MJU set 11 permits parallel operation of these standard MJUs. Depending on the number of MJUs in each MJU set 11, it can perform the bridging function at 56 kb/s increments, to result in 112, 168, 224, etc., kb/s operation. Adjacent data communications channels, carried on conventional data transmission lines, carry data at 56 kb/s, but are distributed between the MJUs and cross-connected in a manner that permits the data to retain its proper sequence.

MJU sets 11 are within central office environments, depicted as locations A, B, and C, of a DDS transmission network service provider. Transmissions between central offices are via standard DDS telephone facilities 15. For purposes of example, facilities 15 are 24-channel T1 lines. However, the invention is not limited to T1 lines or to facilities having any particular number of channels.

Each T1 line 15 has a 125 microsecond frame field containing 193 bits. These 193 bits are comprised of 24 8-bit segments, i.e., bytes, plus 1 bit for framing. Each 8-bit segment is a channel, thus a T1 line 15 has 24 channels each having a 64 kilobit per second (kb/s) bandwidth. Although the total capacity of each channel is 64 kb/s, one bit per byte is used for control purposes. Thus, the effective data rate is 56 kb/s per channel. The signal carried by T1 lines 15 is often referred to as a DS-1 signal.

Customer premise (CP) units 14 are conventional data service and channel service units for interfacing customer premise equipment, such as terminals 12, to a DDS network. An advantage of the invention is that no delay equalization is required, as in the case of prior multichannel multipoint networks. From each remote terminal 12, data is carried on a dedicated line 16 to CP unit 14, and from there, on a standard 4-wire loop connection 17 to a central office.

Each terminal 12 uses n number of 56 kb/s channels, n=1,2 . . . 24, as explained below in connection with FIGS. 2-5. For convenience, only one CP unit 14 and terminal 12 per MJU set 11 are shown, but it should be understood that each cascaded MJU set 11 may have up to three terminals 12, and a non-cascaded MJU set 11 may have up to four.

Central site 13, remote terminals 12, and CP units 14 are customer controlled equipment. Central site 13 receives communications from any remote terminal 12, and sends communications to all remote terminals 12. Direct communications between remote terminals 12 is not provided except via the central site 13.

An example of a system such as that illustrated in FIG. 1 is a bank system having a main computer serving as central site 13, and a number of automatic teller machines (ATMs) that are remote terminals 12. The MJU sets 11 reside in hub offices of a telephone company at locations A, B, and C, and provide multipoint circuits to the bank so that it may communicate with its ATMs.

Communications into and out of MJU sets 11 between central site 13 and remote terminals 12 are either "upstream" or "downstream". Downstream communications are from central site 13 to terminals 12. An example of a downstream message is a framing or polling message, which is broadcast to all terminals 12 at the same time. Upstream communications are from terminals 12 to central site 13. In the example of this description, it is assumed that upstream data is delivered in response to a polling message.

Figure 2:
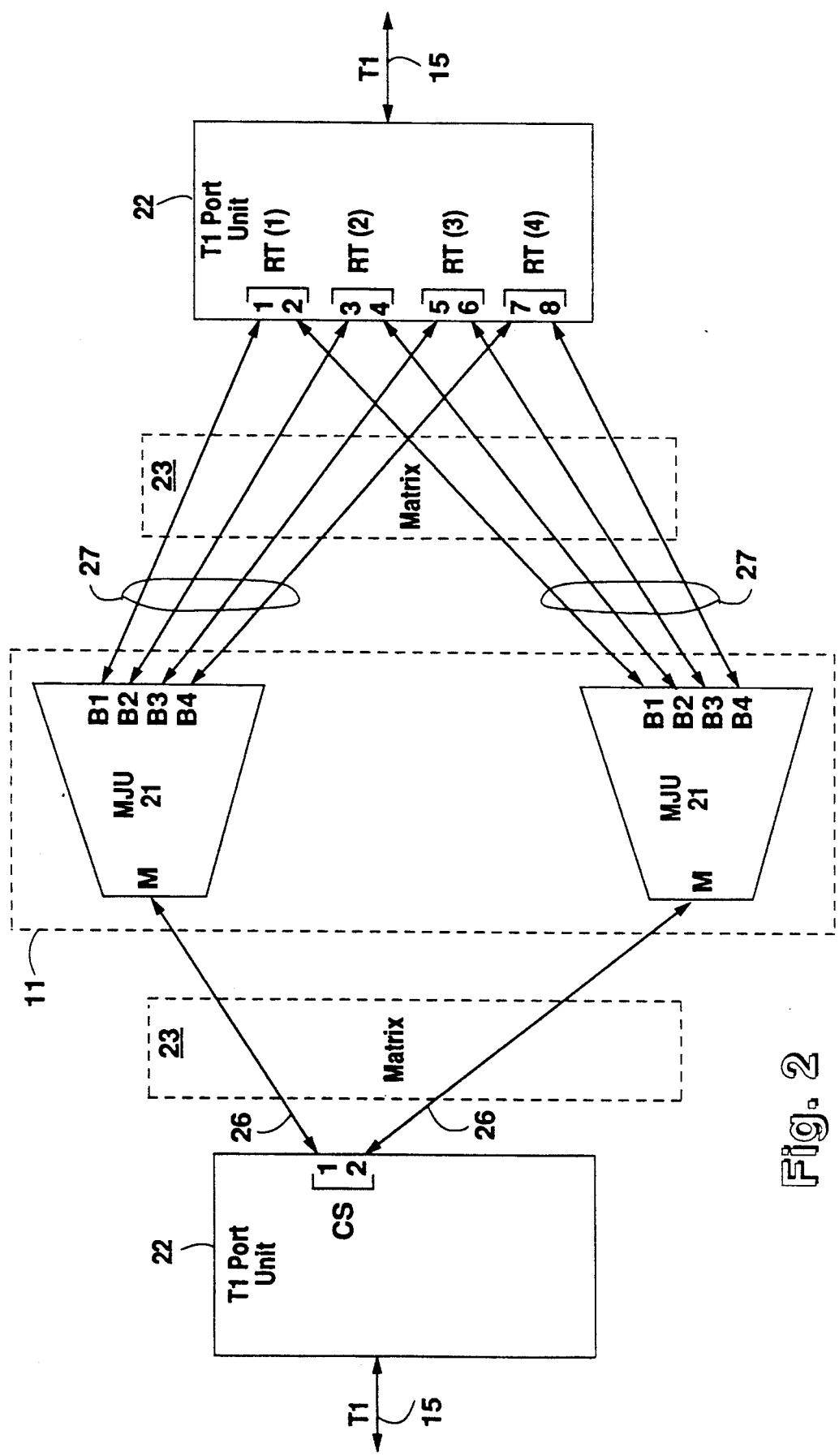
FIG. 2 is a block diagram of an MJU set having two MJUs, T1 port units for an incoming and outgoing T1 lines, and a switching matrix.

FIG. 2 is a block diagram of a single MJU set 11, having two MJUs 21 connected in parallel. This MJU set 11 provides a data communications rate of 112 kb/s. Channels of T1 lines 15 are connected via T1 port units 22 and switching matrix 23 of a central office.

The T1 line 15 between remote terminals 12 and the associated T1 port unit 22 is referred to herein as the "remote terminal line". The T1 line 15 between central site 13 and its corresponding T1 port unit is referred to herein as the "central site line". For purposes of this description, it is assumed that T1 lines 15 are separate T1 lines; each associated with a different T1 port unit 22. However, it is possible that central site 13 and a terminal could share the same T1 line 15 and T1 port unit 22. It is also assumed that only one set of four terminals 12 are connected to the remote terminal T1 line 15. However, more than one set of remote terminals could be on the same T1 line 15, in which case, another MJU set 11 would be used.

T1 port units 22 provide external connections to T1 lines 15. Depending on whether the communication is upstream or downstream, T1 port units 22 are either ingress or egress port units. T1 port units 22 are standard devices, which recognize the T1 framing bit and identify the 24 channels of the T1 lines 15. For purposes of this description, a "central site port unit" 22 handles the T1 line 15 associated with central site 13, and a "remote terminal port unit" 22 handles the T1 line 15 associated with a set of four terminals 12.

Each remote terminal port unit 22 handles up to 24 channels of a T1 line 15 by means of its 24 channel ports, although FIG. 2 shows connections at only eight channel-ports. For an MJU set 11 with 112 kb/s operation, two channels are associated with each remote terminal 12. Thus, the example of FIG. 2 shows connections for the four terminals 12, designated as RT(1)-RT(4). If all 24 channels were used for MJU input, wider bandwidth would be available. For example, four terminals 12 could use MJU sets 11 having n MJUs 21 in parallel connection so as to provide operation at n×56 kb/s, where n=1, 2, . . . 24. The parallel connection for an MJU set 11 having 4 MJUs is explained below in connection with FIG. 4.

Each MJU set 11 is in serial communication with the central site 13, which broadcasts downstream to one or more terminals 11 via the MJU sets 11. In the upstream direction, MJU set 11 combines the bit streams transmitted by the terminals 12 into a serial bit stream for delivery to the central site 13. It is the responsibility of the customer to use appropriate line discipline so that collisions do not occur in the data transmitted to the central site 13. For example, polling techniques may be used so that only one terminal 12 is transmitting data toward the central site 13 at a given time.

MJU set 11 has two MJUs 21 connected in parallel. Each MJU 21, when not parallel connected is a DDS "standard" MJU design. By "standard" is meant that each MJU 21 conforms to the standards set out by Bell Communications Research, Inc. These standards are published in *Digital Data System (DDS) Multipoint Junction Unit (MJU) Requirements*, TA-TSY-000192, Issue 2, April 1986, which is incorporated herein by reference. Thus, each MJU 21 has four data bridging circuits, and each circuit has one master channel and four branch channels. Each MJU 21 performs its data bridging function at a rate of 56 kb/s, and except for its parallel configuration, performs the same basic functions as a single MJU operating in accordance with the TA-TSY-000192 standards. Of course, the invention would be equally useful for parallel connection of MJUs designed under some other standard, or a subsequent revision of TA-TSY-000192, with an underlying concept being that parallel connection of standard MJUs prevents the need for special equipment.

Each MJU 21 has connections for four remote terminals 12, which communicate with the central site 13 via cross connections established between T1 lines 15. The four branch ports of each MJU 21 are designated B1-B4 and the master port is designated as M.

A digital cross connect matrix 23 provides connections that establish the actual communications circuit. For the two-MJU set 11 of FIG. 2, matrix 23 establishes cross connections whereby two channels of an ingressing T1 line 15 are connected to two channels of an egressing T1 line 15. Connections into each MJU set 11 are from T1 channels to branch ports B1-B4, and connections out of each MJU set 11 are from master ports M to T1 channels.

Connections between an MJU set 11 and its T1 port units 22, via matrix 23, are "permanent" connections, often referred to as "nailed-up" connections. During a configuration process, a matrix processor (not shown) is programmed to establish cross connections, which remain until the circuit is reconfigured.

Matrix 23 is a sequential time slot interchange matrix, part of a synchronous time division multiplex system. Thus, matrix 23 stores time slots in random access memory in an ordered sequence, and switching is accomplished by reading out the contents of the slots according to each's destination. Matrix 23 is sequential in the sense the input channels are output from matrix 23 in the same order as received. The operation of matrix 23 may thus be compared to a first-in first out (FIFO) process. As explained below in connection with FIG. 3, these sequential, read-write, time slot interchange features of matrix 23 ensure that the two channels remain adjacent, and thus their data is maintained in the proper order. As an example, channels 3 and 4 of a remote terminal T1 line 15 might be connected to channels 21 and 22 of central site line 15. The cross points of matrix 23 are operated in synchronization with incoming data so that all the data remains in the same frame.

The interconnections of FIG. 2 involve the master port M and the four branch ports B1-B4 of each MJU 21. A master channel 26 from each master port M goes to two channel-ports of central site port unit 22. Also, the four branch ports B1-B4 of each MJU 21 are connected to eight channel-ports of remote terminal port unit 22, one channel per port, via branch links 27.

For n MJUs 21 connected in parallel, the same MJU 21 receives input on every nth channel where n is an integer, 1, 2 . . . 24. Thus, for the two parallel-connected MJUs 21 of FIG. 2, each MJU 21 receives input on every other channel of T1 port 22. In general, MJU number "i" receives input on its four branch ports from channels i, i+n, i+2n and i+3n, where $1 \leq i \leq n$ and $1 \leq n \leq 24$.

In other words, for 112 kb/s operation, which requires two parallel-connected MJUs 21, a first terminal 12 has two adjacent channels, a second terminal has two adjacent channels, and so on, with each set of two channels being distributed between the two MJUs 21. In the example of FIG. 2, a first MJU 21 receives channels 1,3,5, and 7, and a second MJU 21 receives channels 2,4,6, and 8.

Thus, "corresponding" branch ports of each MJU 21 in the set 11 receive data from the same terminal. For example, the corresponding B1 ports of each MJU 21 might receive one channel each from a set of upstream data channels from a remote terminal 12. Similarly, corresponding branch ports B2, B3, or B4 might each receive one channel of another set of channels from another remote terminal 12.

For communications in the downstream direction, the central site T1 port unit 22 spreads the data across master channels 26. Data on each master channel 26 is communicated in parallel to each of the two MJUs 21, each of which then retransmits its data across one or more of its four branch channels 27 and further on to its associated T1 port unit 22.

Figure 3:
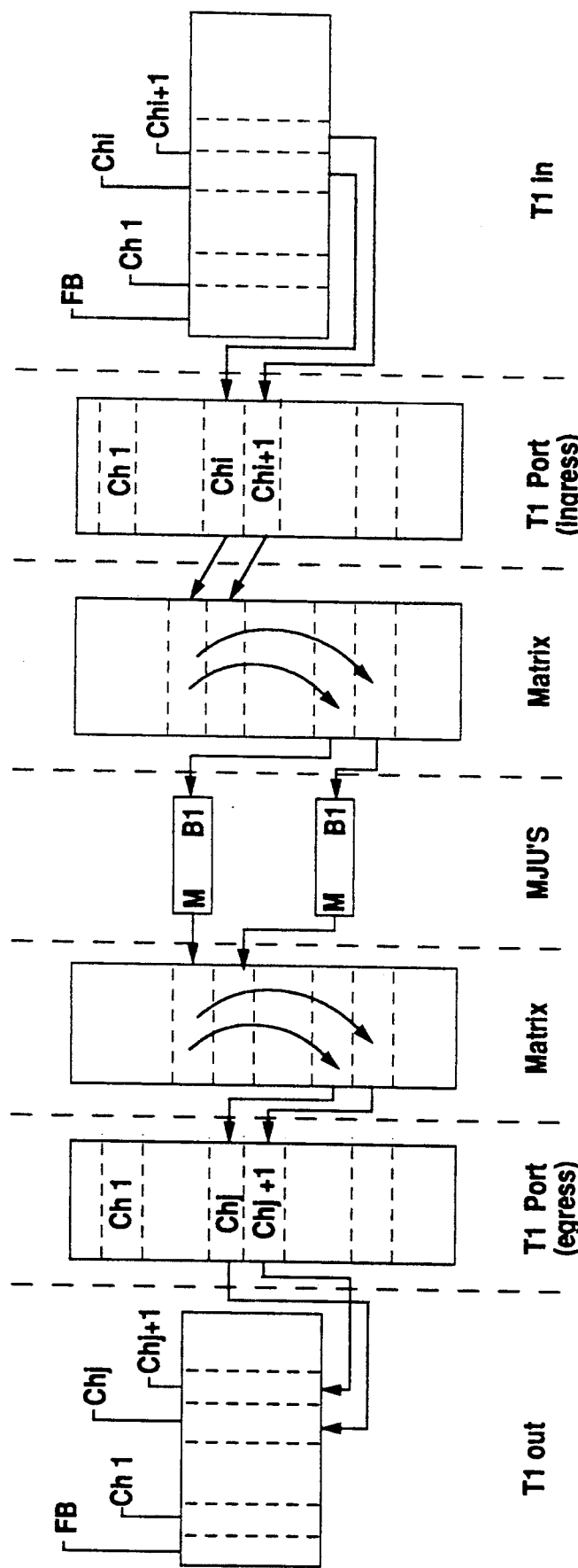
FIG. 3 illustrates how each MJU set receives, processes, and transmits data on adjacent channels in parallel for upstream communication.

FIG. 3 illustrates the upstream communications process for the MJU set 11 of FIG. 2. The two MJUs 21 of MJU set 11 receive, process, and transmit data on two adjacent channels in parallel, such that transmissions on the adjacent channels, between the remote terminal port unit 22 (ingressing) and MJU set 11, and between MJU set 11 and the central site port unit 22 (egressing) are in the same time frame.

For an upstream transmission, data is received from a remote terminal 12 into terminal port unit 22 via remote terminal T1 line 15. For 112 kb/s transmission, two T1 channels, i and i+1, are used. These channels are adjacent in the same time frame, with the frames being separated by a framing bit (FB). Each channel is 8 bits wide with the 8th bit of each channel being a control bit. The 14 data bits might represent a sample of a video image, or some other high bit-rate data. For an active terminal, the 8th bit of each channel is a "1" and the remaining seven bits contain customer data. For inactive terminals, the 8th bit is "0" and the remaining bits are "1s". Thus, 14-bit samples are divided into the seven most significant bits and the seven least significant bits. Each seven-bit segment is placed on one of two adjacent channels to be used for transmission. It is the customer's responsibility to ensure correct data format.

Terminal port unit 22 directs a first channel to a input of matrix 23 and a second channel to a input of matrix 23. Matrix 23 connects channels i and i+1 to a certain MJU branch port, for example, B1. Because of the sequential time slot interchange operation of matrix 23, both B1 branches of the two MJUs receive their data in the same sequence as originally transmitted and in the same frame. Both MJUs 21 perform logic operations to determine whether customer data or control data is being transmitted. As stated above, each channel carries its data in 8-bit word, the 8th bit being a control bit. A "1" in the 8th position indicates that the word contains customer data. A "0" in the 8th position indicates that the word contains network control data. For upstream operations, MJUs 21 perform AND operations on the data bits and OR operations on the control bits to accommodate data mode and control mode data signals, in accordance with MJU standards.

Each MJU 21 of MJU set 11 performs its bridging operation in parallel. For example, the first MJU 21 detects a "1" or "0" in the 8th position of its incoming channel, and the second MJU 21 detects a 37 1" or "0" in the 8th position of its incoming channel. In response to an active terminal code, MJUs 21 allow only that data to pass through to channels 26 via matrix 23. Again, the sequential time slot operation of matrix 23 ensures that the two channels remain in proper sequence.

Matrix 23 connects the two channels, which are now designated as channels j and j+1 of the egressing T1 line, to a port of the egressing T1 port unit 22. The two channels remain adjacent and are delivered by T1 port unit 22 to the outgoing T1 line 15.

T1 port units 22, MJUs 21, and matrix 23 may be part of an integrated cross-connect system. The cross connect system also contains an administrative unit (not shown) for controlling operations of these components. An example of such a cross connect system is the DEX CS cross-connect system, manufactured by DSC Communications Corporation. In that system, T1 port units 22 are "digroup circuits" that provide D1D, D2, and D3/D4 channel numbering, and superframe and T1 intact operation, as well as other software-selectable functions. Matrix 23 is a single-stage, nonblocking time slot interchange.

Figure 4:
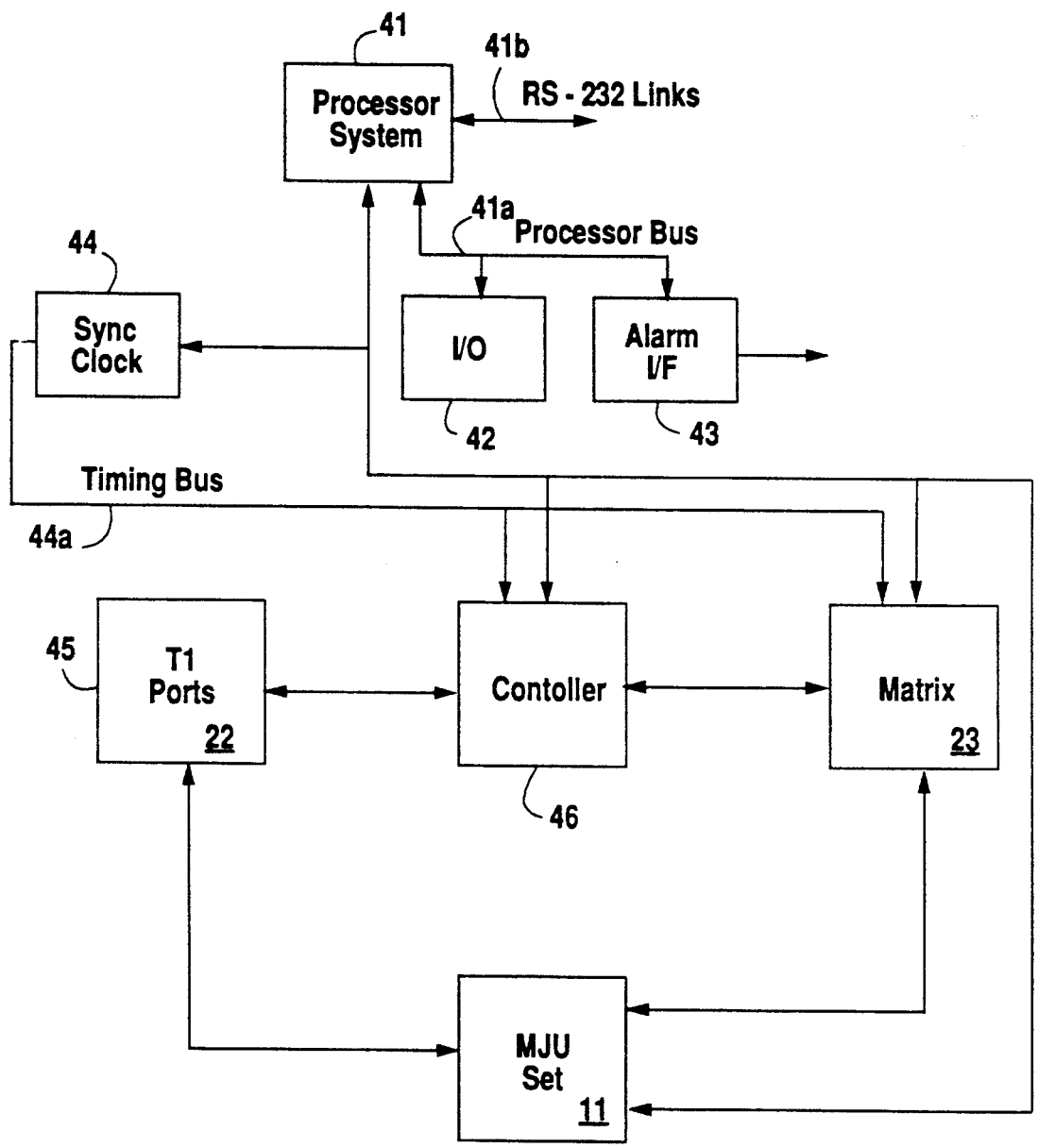
FIG. 4 illustrates an integrated cross connect system, having enhanced features in addition to an MJU set, port units, and matrix.

FIG. 4 illustrates an integrated cross connect system, such as the DEX CS system described in the preceding paragraph. A microprocessor system 41 contains a 16-bit microprocessor for administrative and configuration functions. It communicates with peripheral devices 42 and an alarm interface 43 via a parallel bus 41a. Microprocessor system 41 includes read only memory used for initialization, and random access memory for program and database storage. The RS-232 links 41b can be used for communications with local or remote terminals or with network management centers. The alarm interface 43 reports system failures. When the microprocessor system 41 detect an alarm or power failure, it updates the alarm interface 43. The synchronization clock 44 provides timing and framing clock signals for distribution through the system via a timing bus 44a. A number of T1 port units 22 are contained within a digroup circuit 45. Different configurations of digroup circuit 45 support different ranges signal rates, ranging from DS1 to DS3 rates. A controller 46 provides functions such as serial/parallel path conversions, error and alarm reporting to microprocessor system 41, and other interface operations. Matrix 23 permits various permutations of channels and ports. Via a microprocessor system 41, a user can control the master and branch connections of the MJU set 11.

FIG. 5 illustrates an MJU set 51 having four MJUs 21 connected in parallel, to provide a 224 kB/s data rate. FIG. 5 also illustrates the remote terminal port unit 22 and central site port unit 22, and the interconnections. A switching matrix 23 operates in a manner similar to that of FIG. 2. As in the MJU set 11, MJUs 21 are standard MJUs. In a manner analogous to the interconnections of FIG. 2, each MJU 21 receives four channels from four remote terminals 12. For 224 kb/s operation, each remote terminal (RT1-RT4) uses four adjacent channels. The channels from each remote terminal are distributed from adjacent T1 channel-outputs of the remote terminal port unit, among the MJUs 21 such that each MJU 21 receives one channel from each terminal 12. Branch B1 of all four MJUs 21 receives data from terminal 1, and branch B2 of all four MJUs 21 receives data from terminal 2 and so on. In general, MJU number "i" will receive input on its four branches from channels i, i+n, i+2n, and i+3n, where $1 \leq i \leq n$ and $1 \leq n \leq 24$. The value "n" is the number of MJUs 21 operating in parallel to form the MJU set 11.

During operation, each channel of the four channels from a remote terminal contains a control bit, to inform the MJU 21 that customer data is being received. In the same manner as for the MJU set 11, the sequential time slot interchange operation of switching matrix 23 ensures that the proper data sequence is maintained.

For any of the parallel-connected MJU sets, such as MJU set 11 or MJU set 51, testing is accomplished by placing control codes in each of the master port links 26. Examples of test operations are MJU branch select, MJU branch block, and MJU loop-up. For n parallel-connected MJUs, appropriate control codes are placed in n master links 26 and transmitted in the downstream direction. With respect to each individual MJU in the set, testing is the same as set out in the published TA-TSY-000192 MJU standard.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of interconnecting at least two standard multiple junction units (MJUs) for providing wideband data bridging on data channels of a transmission line, comprising the steps of:
   connecting a branch port of a first MJU to a first channel-port of a remote terminal port unit;
   connecting a corresponding branch port of a second MJU to a second channel-port of said remote terminal port unit, wherein said first channel-port and said second channel-port of said remote terminal port unit are for adjacent channels;
   connecting a master port of said first MJU to a first channel-port of a central site port unit; and
   connecting a mater port of said second MJU to a second channel-port of said central site port unit, wherein said first channel-port and said second channel-port of said control site port unit are for adjacent channels;
   wherein all connections are by means of a time slot interchange switching system, such that during operation, data transmitted on adjacent channels will arrive on adjacent channels.

2. The method of claim 1, and further comprising the step of connecting T1 transmission lines to said port units for transmitting said data on adjacent channels.

3. The method of claim 1, wherein said remote terminal port unit and said central site port unit are T1 port units.

4. The method of claim 1, and further comprising the step of repeating said connecting steps for three or more MJUs such that data may be transmitted on three adjacent channels.

5. The method of claim 1, and further comprising the step of establishing said connections by means of a microprocessor system on a permanent basis.

6. The method of claim 1, wherein said connections are established at a central office of a digital data service provider.

7. A method of using a set of standard multipoint junction units to direct upstream communications from remote terminal sites of a multipoint network to a central control site, comprising the steps of:
   receiving a number of adjacent incoming data channels into adjacent incoming channel-ports of an ingress port unit, wherein each channel contains data formatted into 8-bit words, each word having at least one control bit indicating an upstream communication;
   using a sequential time slot interchange switching matrix to connect each of said adjacent incoming channel-ports to branch ports of a number of MJUs, wherein said MJUs receive their channel data into corresponding branch ports;
   using said MJUs to perform their bridging operations to direct said channels to a master port of each of said MJUs, wherein said MJUs are standard MJUs and wherein the number of MJUs is the same as the number of adjacent data channels; and
   using said time slot interchange switching matrix to connect each of said master ports to adjacent channel-ports of an egressing port unit.

8. The method of claim 7, and further comprising the step of using T1 communications lines to transmit said adjacent incoming data channels to and from said port units.

9. The method of claim 7, and further comprising the step of synchronizing said time slot interchange switching matrix such that data on said channels remains in the same frame.

10. The method of claim 7, wherein said MJUs comprise a set of MJUs containing up to twenty four MJUs for connection to a remote terminal, with the transmission rate being the product of 56 Kilobits per second times the number of said MJUs in said set.

11. The method of claim 7, wherein said MJUs comprise a set of MJUs containing up to six MJUs for connection to up to four remote terminals, with the transmission rate being the product of 56 Kilobits per second times the number of MJUs in said set.

12. A multipoint data communications network for providing wideband data transmissions between a number of remote terminals and a central site, comprising:
   at least two standard multipoint junction units (MJUs), each having four branch ports and a master port;
   a central site port unit for sending or receiving sets of adjacent data channels on a transmission line between a central site and a central office of a carrier, said port unit having a channel-output connected to each master port of each of said MJUs;
   a remote terminal port unit for sending or receiving sets of adjacent data channels on a transmission line between remote terminals and said central office, said port unit having a channel-output connected to a corresponding branch port of each of said MJUs, such that data to or from a remote terminal is distributed among said MJUs;
   wherein the connections between said port units and said MJUs have means for connection to a time slot interchange switching matrix, such that said connections are via said matrix such that incoming or outgoing data on adjacent data channels remains in the proper sequence.

13. The network of claim 12, and further comprising a time slot interchange matrix for establishing said connections.

14. The network of claim 13, wherein said matrix is a single stage non blocking matrix.

15. The network of claim 12, wherein said central site port unit and said remote terminal port unit are T1 port units.

16. The network of claim 12, and further comprising a microprocessor system for controlling the operation of said matrix.

17. The network of claim 16, wherein said connections are permanent connections controlled by programming of said microprocessor system.

18. The network of claim 12, and further comprising a synchronization means for synchronizing the operations of said network.

* * * * *